UNITED STATES PATENT OFFICE.

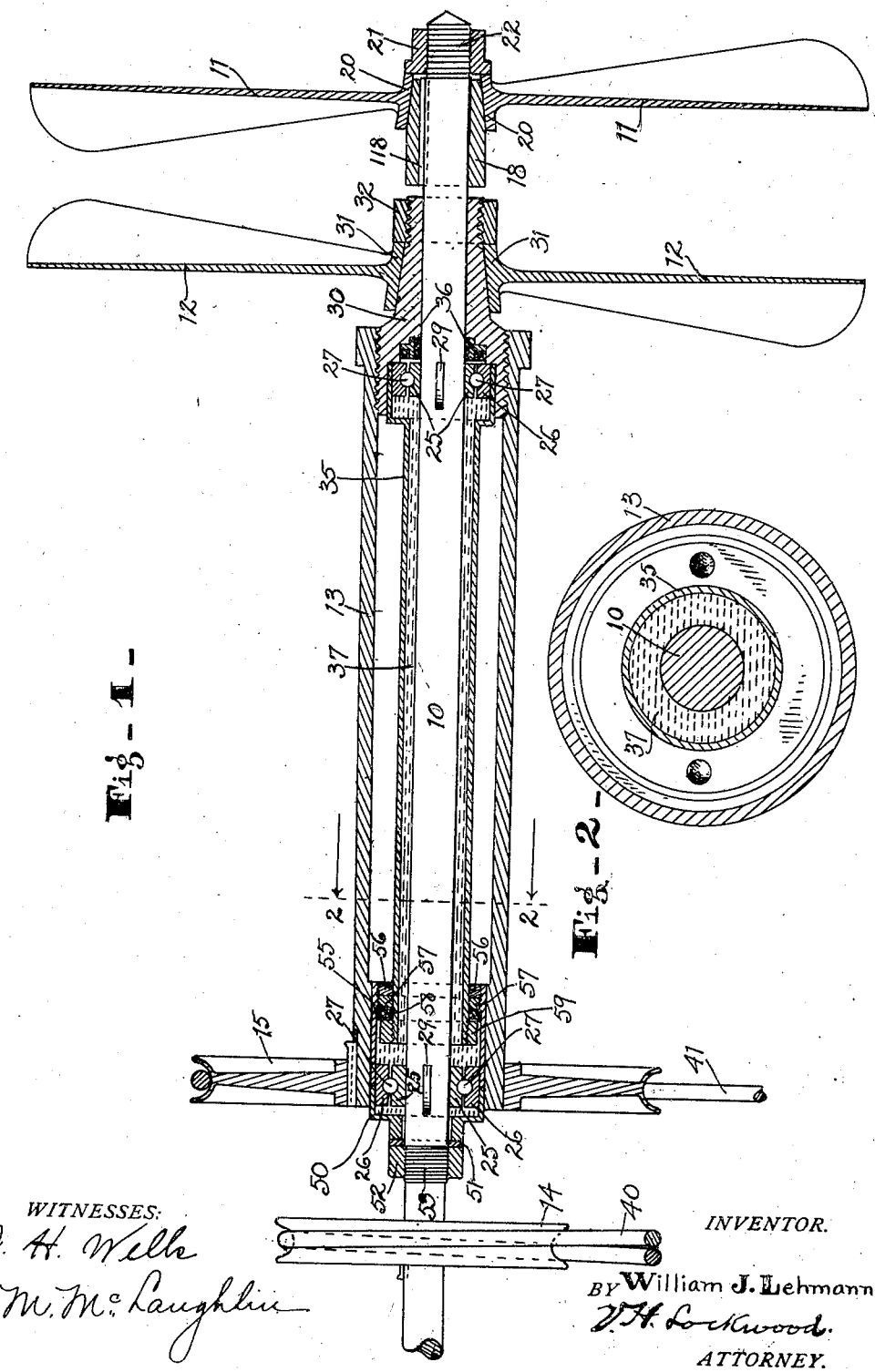

WILLIAM J. LEHMANN, OF INDIANAPOLIS, INDIANA.

PROPELLER FOR AIR-CRAFT.

996,987.

Specification of Letters Patent. Patented July 4, 1911.

Application filed July 28, 1910. Serial No. 574,263.

*To all whom it may concern:*

Be it known that I, WILLIAM J. LEHMANN, of Indianapolis, county of Marion, and State of Indiana, have invented a certain useful Propeller for Air-Craft; and I do hereby declare that the following is a full, clear, and exact description thereof, reference being had to the accompanying drawings.

The object of this invention is to provide an improved propeller construction for air craft so as to increase the propelling power in proportion to the motive power utilized, and also to increase the durability of the structure. To that end two propellers are arranged one in front of the other, and so as to be revolved in opposite directions from a single source of power.

The other features of the invention will appear from the accompanying drawings and the following description and claims.

In the drawings Figure 1 is a longitudinal central section through the device, the central shaft being broken off at one end and the motor not being shown, and the driving belts being shown but partly broken away, and one pulley being shown in elevation. Fig. 2 is a transverse section on the line 2—2 of Fig. 1.

The construction herein shown has a central solid shaft 10 on which a propeller 11 is secured. Another propeller 12 is secured immediately in front of said propeller 11 in connection with a tubular shaft 13 which surrounds said solid shaft. The solid shaft has a sheave pulley 14 keyed on it and is driven by a belt 40 which is twisted, and the outer shaft 13 has a sheave pulley 15 keyed on it, and is driven by the belt 41 which is not twisted. These two belts 40 and 41 are adapted to receive power from a single source or motor shaft and drive their respective shafts and propellers in opposite directions. However, the invention is not limited to the particular means for transmitting power from the motor to the two shafts 10 and 13, provided whatever means is employed shall drive them in opposite directions.

Coming now to the details of the construction, the inner shaft has keyed on it by key 118 near its end a tapering hollow spindle 18 on which the tapering hub 20 of the propeller 11 is adapted to be wedged and held in place by the nut 21 on the threaded portion 22 of the shaft 10. This renders the propeller readily removable, but the chief value of the construction is because, while the propeller is held firmly enough for transmitting any power, that would be practically sent to it under usual working conditions, it would still have the capacity of yielding or slipping if it struck some hard object or was by the wind or otherwise subjected to a very unusual strain. The propeller 12 likewise has a tapering hub 31 which is wedged on a tapering spindle 30 that screws into one end of the outer tubular shaft 13. A nut 32 on the threaded reduced end of said spindle tightens and holds the hub of the propeller on the spindle, and what was said of the mounting of the propeller 11 applies to the mounting of the propeller 12. The spindle 30 revolves on the shaft 10, however, while the spindle 18 is secured or keyed to the shaft 10.

The manner of mounting the outer shaft 13 on the inner shaft 10 is as follows: Bearing rings 26 are secured by the keys 29 to the inner shaft 10 within but not in engagement with each end of the outer shaft 13. The bearing rings 26 surround the bearing rings 25 and said rings are provided with ball races for the bearing balls 27. The outer bearing ring 26 at one end of the device is secured to the enlarged end of a tube or sleeve 35 which surrounds the inner shaft 10, and likewise within the outer shaft 13, and is spaced from both shafts. Said enlarged end of the tube 35 is secured to the spindle 30, that is, the enlarged end of the spindle 30 surrounds and is secured to the enlarged end of the tube 35. The packing ring 36 surrounds and hugs the shaft 10 and lies between the bearing rings 25 and 26 on the one hand and the spindle 30 on the other so as to prevent the oil 37, which is inclosed in the space between the shaft 10 and tube 35, from escaping at the right-hand end of said tube. The outer bearing ring 26 at the left-hand end of the device is secured to a cap sleeve 50 which has a reduced end that rather snugly surrounds the shaft 10, and against that end a felt washer 51 is placed and a nut 52 screws up against the felt washer and cap on the threaded portion 53 of the shaft 10. The felt washer is to prevent the escape of lubricating oil within the tube 35 and the cap sleeve 50. Said cap sleeve 50 is shrunk on the outer bearing ring 26 and the end of the outer shaft 13 is shrunk on said cap sleeve, and another sleeve 55 within the outer shaft overlaps a portion of the outer bearing ring 26 and is shrunk on it at one end and at the other end overlaps the tube 35 and is internally threaded to receive the rings 56 and 57 that compress the packing 58 against the ring 59 which screws on the outer surface of the left-hand end of the tube 35. This is also to prevent the escape of the lubricating oil. This construction provides for an ample allowance of lubricating oil between the inner and outer shaft constructions so that the friction will be reduced to a minimum. The spindle 30 should be so loose on the shaft 10 that there is no friction between them. The two bearings provide the only friction excepting what results from the packing.

I claim as my invention:

1. A propeller for air craft including a central shaft, a propeller secured thereon, means for driving said shaft, a tubular shaft surrounding and spaced from said first-mentioned shaft between the propeller and driving wheel thereon, a bearing hub surrounding said first-mentioned shaft to which said tubular shaft is secured at one end, a propeller on said bearing hub, a bearing at the other end on said first-mentioned shaft and to which said tubular shaft is secured, and a separate means for driving said tubular shaft.

2. A propeller for air craft including a central shaft, a propeller secured on one end thereof, a driving wheel secured on said shaft, bearing rings secured on said shaft between the propeller and driving wheel, bearings surrounding said bearing rings, a tube secured to said bearing rings and surrounding and spaced from said shaft, a bearing hub secured on one end of said tube, a propeller secured on said propeller hub, an outer tubular shaft secured on said propeller hub at one end and on the outer bearing ring at the other end and spaced from said tube, packing for closing the chamber within said tube, and a driving wheel secured on said outer tubular shaft.

In witness whereof, I have hereunto affixed my signature in the presence of the witnesses herein named.

WILLIAM J. LEHMANN.

Witnesses:
G. H. BOINK,
O. M. MCLAUGHLIN.

---

Copies of this patent may be obtained for five cents each, by addressing the "Commissioner of Patents, Washington, D. C."